United States Patent
Shpinev

(10) Patent No.: US 8,564,150 B2
(45) Date of Patent: Oct. 22, 2013

(54) WAVE POWER PLANT

(76) Inventor: Igor Nikolaevich Shpinev, Tallinn (EE)

( * ) Notice: Subject to any disclaimer, the term of this patent is extended or adjusted under 35 U.S.C. 154(b) by 158 days.

(21) Appl. No.: 13/241,244

(22) Filed: Sep. 23, 2011

(65) Prior Publication Data

US 2012/0013127 A1    Jan. 19, 2012

Related U.S. Application Data

(63) Continuation-in-part of application No. PCT/RU2009/000166, filed on Apr. 8, 2009.

(51) Int. Cl.
    *F03B 13/20*    (2006.01)
(52) U.S. Cl.
    USPC .............................................. 290/53; 60/504
(58) Field of Classification Search
    USPC ..................................... 290/42, 53
    See application file for complete search history.

(56) References Cited

U.S. PATENT DOCUMENTS

| | | | |
|---|---|---|---|
| 4,421,461 A * | 12/1983 | Hicks et al. ...................... | 417/53 |
| 5,424,582 A * | 6/1995 | Trepl et al. ...................... | 290/53 |
| 2008/0206077 A1 | 8/2008 | Royset | |

FOREIGN PATENT DOCUMENTS

| | | |
|---|---|---|
| DE | 60218900 T2 | 12/2007 |
| DE | 202006010897 U1 | 12/2007 |
| EP | 1342916 A1 | 9/2003 |
| SU | 1291489 A1 | 2/1987 |

* cited by examiner

*Primary Examiner* — Tulsidas C Patel
*Assistant Examiner* — Sean Gugger
(74) *Attorney, Agent, or Firm* — Patent Jurist; Georgiy L. Khayet

(57) ABSTRACT

A wave power plant is disclosed. The wave power plant is designed for converting the energy of the disturbed water surface into the energy of the output shaft. The wave power plant can include a displacement body floating on the water surface, the displacement body having an internal installation of a technological working machine that is driven by the tension force of a cable connecting the body to a diving, floating anchor. The force of the cable tension rises each time the displacement body moves upward. An anchor suspended beneath the displacement body allows for utilizing the wave power plant on floating facilities (e.g., safe rafts and boats, floating data centers, boats, and floating platforms) found within the offshore areas of the oceans in the large open sea areas with great depth.

5 Claims, 1 Drawing Sheet

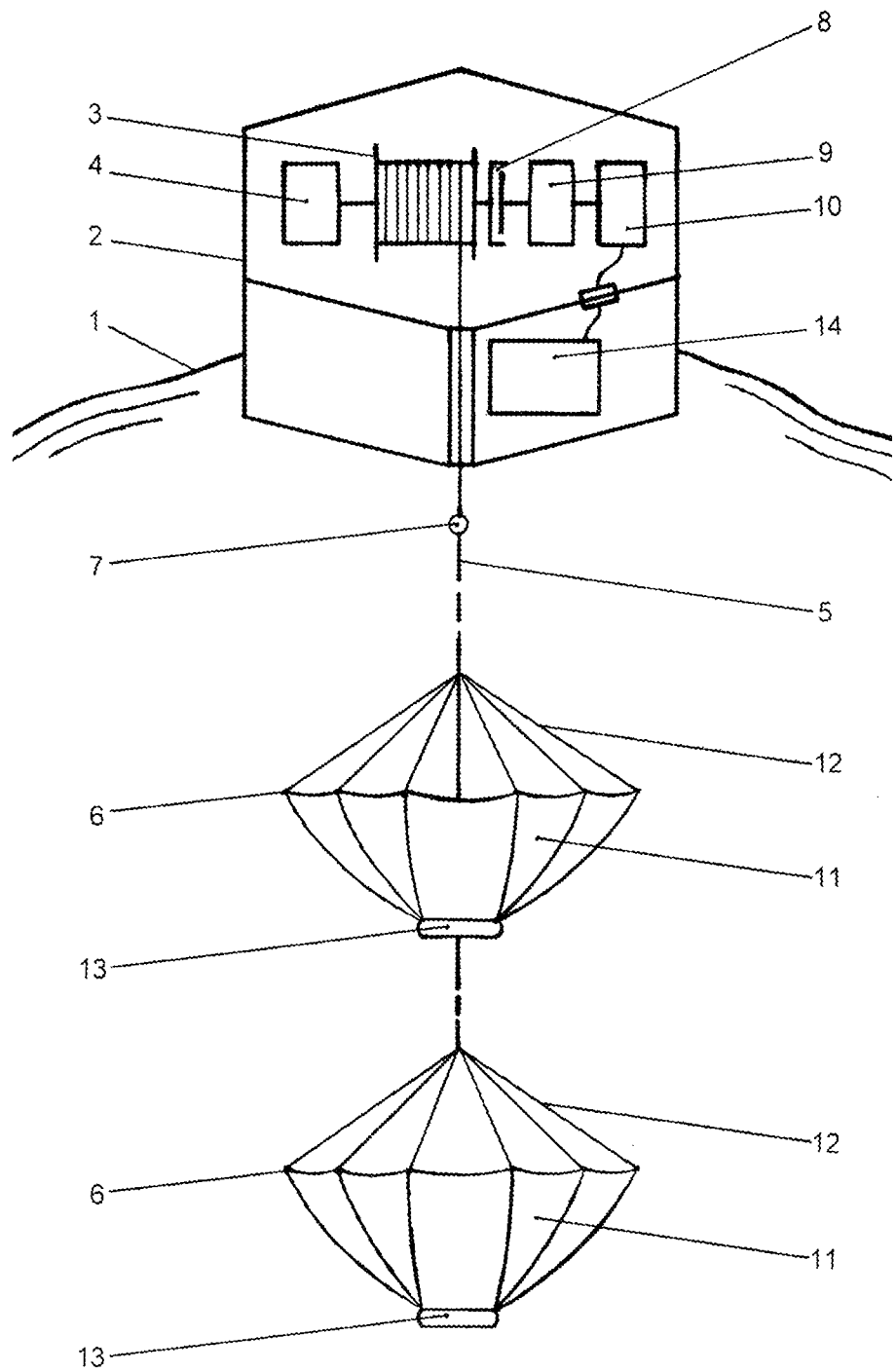

WAVE POWER PLANT

RELATED APPLICATIONS

This Patent Application is a Continuation-In-Part application of International Application PCT/RU2009/000166 filed on Apr. 8, 2009, now pending.

FIELD

The invention is related to hydro energetics and, more specifically, to harvesting the kinetic and potential energy of the surface waves of the oceans.

BACKGROUND

Some current solutions related to extracting wave power utilize the tension force of a cable or chain created when a floating water displacement body is lifted by a wave while being tied by a cable to another body fixed on the bottom. Additionally, in some other current solutions, a floating water displacement body can be anchored by a cable to a rotating reel mounted on the bottom of the water reservoir while the floating water displacement body is riding waves. As the cable unwinds from the reel, it can cause a technological working machine connected to the reel via a gearbox to rotate, thereby generating power. The technological working machine may include an electric power generator, a desalinization plant of reverse osmosis, and a pump.

However, the current solutions do not allow harvesting of the wave energy offshore in large open sea areas with greater depths, where wave energy is maximal.

SUMMARY

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

A wave power plant is disclosed. In some example embodiments, the wave power plant may include a displacement body with a technological working machine installed on it, with the technological working machine being connected via a transfer box and the overrunning clutch to a reel having a rewinding mechanism, with a cable wound on the reel, and the cable being connected to an anchor, wherein in order for the wave power plant to produce more power and to be used on crafts located in open sea, the anchor is able to float, dive and be lowered to a depth greater than a wave length. In order to increase efficiency of the technological working machine, the cable can be equipped with a limiter. The technological working machine can include an electric power generator, a desalinization plant of reverse osmosis, and a pump.

BRIEF DESCRIPTION OF DRAWINGS

Example embodiments are illustrated by way of example and not limitation in the figures of the accompanying drawings, in which like references indicate similar elements and in which:

FIG. 1 shows a wave power plant, in accordance with an example embodiment.

DETAILED DESCRIPTION

The following detailed description includes references to the accompanying drawing, which form a part of the detailed description. The drawing shows an illustration in accordance with example embodiments. These example embodiments, which are also referred to herein as "examples," are described in enough detail to enable those skilled in the art to practice the present subject matter. The embodiments can be combined, and other embodiments can be formed by introducing structural, logical or electrical changes without departing from the scope of what is claimed. The following detailed description is, therefore, not to be taken in a limiting sense, and the scope is defined by the appended claims and their equivalents.

In this document, the terms "a" or "an" are used, as is common in patent documents, to include one or more than one. In this document, the term "or" is used to refer to a nonexclusive "or," such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

The technology described herein may provide the ability to harvest wave energy offshore, using deep-sea floating facilities found in open sea areas, such as, for example, rescue rafts and boats, floating data centers, yachts, floating drilling platforms, and so forth.

FIG. 1 shows an example wave power plant containing a displacement body 2 floating freely on a water surface 1. A reel 3 is installed on the displacement body 2 and is equipped with a rewinding mechanism 4 that returns the reel 3 to its original position. A cable 5 is wound around the reel 3 and is coupled to the displacement body 2. The free end of the cable 5 is connected to an anchor 6 which can float and dive. The wave power plant can be equipped with a limiter 7 which can prevent the shortening of the free end of the cable to a length smaller than the length of the wave. The reel 3 is connected to a transfer box (e.g., gearbox, variator, and distributing mechanism) 9 via an overrunning clutch 8. The transfer box 9 can be loaded onto a technological working machine 10. The anchor 6 can be free-floating and carried out, for example, as water domes 11 with straps 12 by which the water domes 11 are attached to the cable 5. One or more weights 13 can be attached to the bottom of the water domes 11, providing for submersion of the water domes 11 when the cable 5 is released.

The wave power plant can function as follows:

In the absence of waves, the displacement body 2 is freely floating on the water surface 1, and the cable 5 is unwound to a length greater than that determined by the setting of the limiter 7 and stretched by the weights 13 beneath the displacement body 2. Fixed on the reel 3, the end of the cable 5 is wound on the reel 3, and a slack in the cable 5 is fully removed by rewinding mechanism 4.

During a disturbance of the water surface 1, the displacement body 2 rises over the water surface 1 of the wave coming from an arbitrary direction and starts to pull up the floating anchor 6, which causes the water domes 11 to unfold. This results in a resistance force which stretches the cable 5 and forces it to unwind from the reel 3 as it overcomes the force of rewinding mechanism 4. The reel 3 transmits the rotational motion via the overrunning clutch 8 to the transfer box 9, which spins the rotor of the technological working machine 10. The technological working machine 10 starts generating electric energy, which can be processed or accumulated in a battery 14 installed within the displacement body 2 of the wave power plant or/and conveyed to another floating craft or object that is fixed relative to the shore or seabed.

When the wave recedes and the displacement body 2 goes down, the tension of the cable 5 weakens, the overrunning clutch 8 stops to transmit the rotational motion to transfer box 9, and the technological working machine 10 continues to run for some time due to the inertia of the technological working machine 10 and the components of the transfer box 9. The rewinding mechanism 4 removes any slack in the cable 5 up to the moment when the limiter 7 engages, and the weights 13 start to sink, folding the domes 11 of the anchor 6 and pulling the cable 5 in a position "beneath the displacement body 2".

Thus, the floating diving anchor 6 on the free end of the cable 5, which synchronously repeats the vertical motion of the displacement body 2 of the wave power plant, carries out a threefold function:

creates the necessary tension of cable 5 when the displacement body 2 is moving from the trough of the wave to its crest;

provides a constant tension of the cable 5 and thus, the constant readiness of the cable 5 to accept the tensile load when the displacement body 2 is moving from the crest of the wave to its trough; and provides a stabilization of the displacement body 2 in space, thereby allowing the displacement body 2 to press against the water's surface in a critical time of action of an incoming wave and excluding the possibility of overturning the displacement body 2 and optimizing the work of mechanisms of the device.

The limiter 7, which does not allow the free end of the cable 5 to be pulled inside the displacement body 2 beyond the length of wave, ensures the fulfillment of the condition in which the anchor of the device will be located outside the oscillation area of water particles in the wave, thus causing the force of tension of the cable 5 between the displacement body 2 and anchor 6 to be maximal.

In order to match the large tension force of the cable 5 to the optimum angular momentum of the axle of the technological working machine 10 and to provide efficiency for the extraction of energy, the technological working machine 10 can have a flywheel and be connected to the transfer box 9 in an N-fold amount through a distribution box.

Two optimal ways to use the device are suggested:
1) Self-contained vessels (e.g., rafts, boats, yachts, floating data centers, and oil platforms) can be equipped with the device, which is structurally made in a form of a buoy. When necessary, the buoy can be lowered overboard and drift attached to the ship as the ship restocks the supplies. Additionally, a small vessel can serve as the displacement body 2 of the device.
2) In the industrial (commercial) use, specialized industrial vessels (e.g., electric propulsion ships), which are based on board of a large ship or a floating base, can be equipped with such devices. As the floating base processes information about the meteorological conditions, it can deliver the industrial vessels to the areas with the wave conditions optimal for their performance. There, the industrial vessels will be put on water and using garlands of the devices, buoys will convert the mechanical energy of the wave disturbance into a product (e.g., electric energy), which will be accumulated in the on-board storage systems of the industrial vessels.

The use of devices at great depths in the open sea will allow for utilizing the energy of waves of any length (up to 400 meters and more) and height (up to 25 meters and more).

As the storage on board of the industrial vessels is filled, the vessels will moor to the floating base to transfer the product and then are sent off again to harvest the product.

After the storage in the floating base is filled:
the floating base can interrupt work in the work area and transfer the product to the nearest specialized terminal, or
a transport vessel can be moored to the floating base in order to handle and ship the product to a port.

This approach will not require use of expensive and sensitive marine cables and, in addition, the industrial vessels will provide their own power.

What I claim is:

1. A wave power plant comprising:
a vessel freely floating on a water surface;
a technological working machine installed on the vessel, the technological working machine being connected via a transfer box and an overrunning clutch to a reel having a rewinding mechanism that returns the reel to an original position;
a cable wound on the reel;
an anchor being carried out as water domes with straps by which the anchor connects to a free end of the cable, the anchor being able to float, dive, and be lowered to a depth greater than a wave length;
one or more weights attached to the bottom of the water domes, the one or more weights providing for submersion of the water domes when the cable is released;
a limiter installed on the cable to prevent shortening of the free end of the cable to a length smaller than a length of a wave; and
wherein upon a disturbance of the water surface, the vessel rises over the water surface of the wave coming from an arbitrary direction and starts pulling up the anchor which causes the water domes to unfold, thereby resulting in a resistance force which stretches the cable and forces the cable to unwind from the reel as the cable overcomes a force of the rewinding mechanism with the reel transmitting the rotational motion via the overrunning clutch to the transfer box, which spins a rotor of the technological working machine and starts generating electric energy, which can be processed or accumulated in a battery installed within the vessel of the wave power plant.

2. The wave power plant of claim 1, wherein in order to increase an efficiency of the technological working machine, the cable is equipped with a limiter.

3. The wave power plant of claim 1, wherein the technological working machine is an electric power generator.

4. The wave power plant of claim 1, wherein the technological working machine is a desalinization plant of reverse osmosis.

5. The wave power plant of claim 1, wherein the technological working machine is a pump.

* * * * *